No. 647,488. Patented Apr. 17, 1900.
H. FUNK & K. TSCHIPKE.
VENT FOR BARRELS.
(Application filed July 21, 1899.)

(No Model.)

Witnesses:
John Becker.
William Schulz.

Inventors:
Henry Funk &
Kurt Tschipke
per Roeder & Briesen
Attorneys.

UNITED STATES PATENT OFFICE.

HENRY FUNK AND KURT TSCHIPKE, OF NEW YORK, N. Y.

VENT FOR BARRELS.

SPECIFICATION forming part of Letters Patent No. 647,488, dated April 17, 1900.

Application filed July 21, 1899. Serial No. 724,598. (No model.)

*To all whom it may concern:*

Be it known that we, HENRY FUNK and KURT TSCHIPKE, citizens of the United States, and residents of New York city, New York, have invented certain new and useful Improvements in Vents for Barrels, of which the following is a specification.

This invention relates to an improved vent for beer-barrels, which is so constructed that the contents of the barrels may be subjected either to the pressure of the atmosphere or of compressed gas and that any accumulated gases may freely escape from the barrel.

Figure 1:
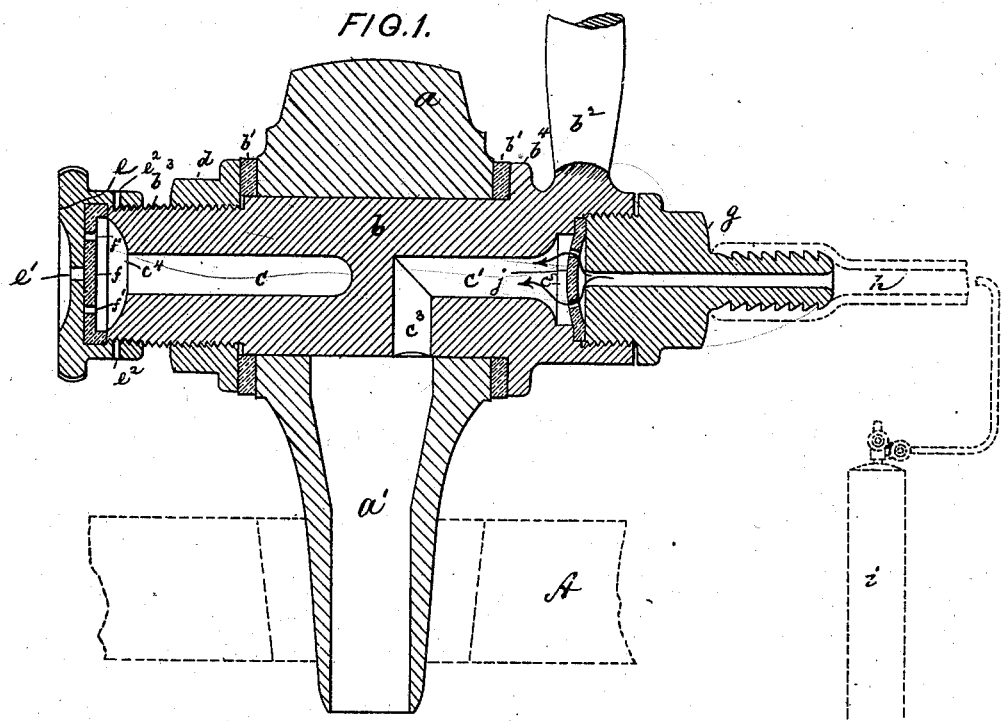
Figure 2:
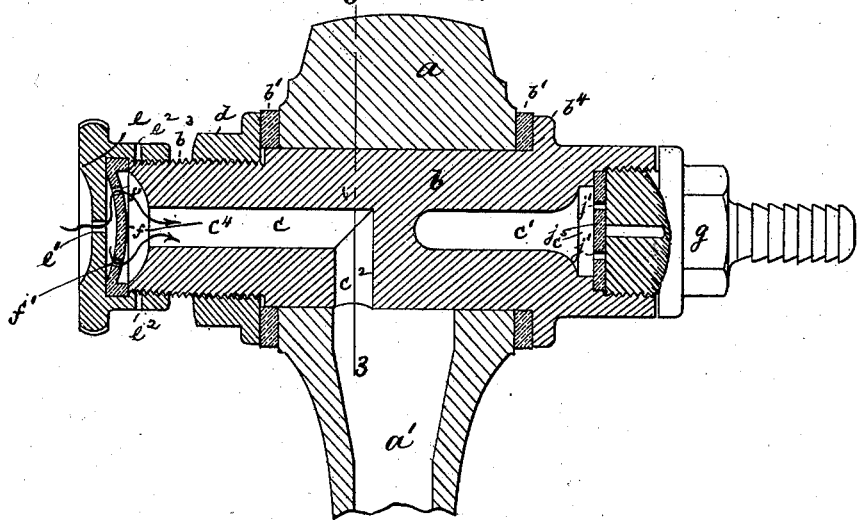
Figure 3:
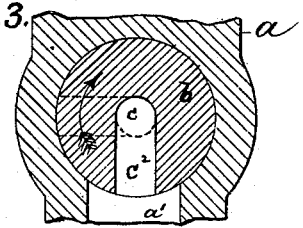

In the accompanying drawings, Figure 1 is a longitudinal section of our improved vent; Fig. 2, a similar section, partly in side view, showing the cock in a different position; and Fig. 3, a cross-section on line 3 3, Fig. 2.

The letter $a$ represents the casing of the vent, provided with the tubular shank $a'$, adapted to be driven into the keg A. Within a transverse bore of casing $a$ is rotatably seated a two-way cock $b$, packed at $b'$ $b'$ and adapted to be turned by means of a handle $b^2$. The cock $b$ is provided at each end with an outwardly-opening axial bore or duct $c$ and $c'$, that may be placed in communication with the bore of shank $a'$ by means of the transverse ducts $c^2$ $c^3$, set at about right angles to each other, so that if the passage $c$ $c^2$ communicates with the interior of the keg the passage $c'$ $c^3$ is shut off, and vice versa.

One threaded end $b^3$ of cock $b$ carries a nut $d$, which, coöperating with a shoulder $b^4$, holds the cock and packing to its seat. A tapped cap $e$, having a perforation $e'$ in its body and perforations $e^2$ in its flange, engages the end of thread $b^3$. This cap holds to its seat a disk valve $f$, perforated at $f'$ $f'$ out of alinement with the perforation $e'$ of the cap and placed opposite to a chamber or enlargement $c^4$ of duct $c$. The opposite end of cock $b$ is tapped for the reception of a threaded nipple $g$, adapted to be connected by means of a coupling $h$ to a cylinder $i$, (shown on a reduced scale,) containing carbonic-acid gas, compressed air, or any other gas under pressure. The inner end of nipple $g$ holds to its seat a disk valve $j$, perforated at $j'$ $j'$ and placed opposite to a chamber or enlargement $c^5$ of duct $c'$.

The operation is as follows: If neither atmospheric air nor gas under pressure is to be admitted to the keg, the cock is so turned that both of the ducts $c^2$ $c^3$ are out of communication with the shank $a'$. If gas under pressure is to be admitted, the cock is so turned that the duct $c'$ $c^3$ is brought into communication with the shank, while duct $c$ $c^2$ is disconnected, Fig. 1. If atmospheric air is to be admitted, the cock is so turned that the duct $c$ $c^2$ is brought into communication with the shank, while the duct $c'$ $c^3$ is disconnected, Fig. 2. By slightly unscrewing the cap $e$ confined gases will be allowed to escape from the interior of the keg through passage $c^2$ $c$, chamber $c^4$, and the perforations $e^2$ of the cap-flange. Thus it will be seen that in our vent the cock can be so manipulated that either natural or artificial pressure may be obtained at will, that the confined gases may readily escape, or that all exterior communication with the contents of the keg may be shut off.

What we claim is—

1. In a vent for barrels, the combination of a casing with a rotatable cock having a pair of ducts that open into the casing at different angles, a valve arranged within each of the ducts, and means for connecting one of the ducts to a gas-cylinder, substantially as specified.

2. In a vent for barrels, the combination of a casing with a rotatable cock having a pair of ducts that open into the casing at different angles, a valve arranged within each of the ducts, a perforated cap engaged by one of said valves, and a nipple arranged opposite to the other valve, substantially as specified.

3. In a vent for barrels, the combination of a casing with a rotatable cock having a pair of ducts that open into the casing at different angles, a valve arranged within each of the ducts, a cap having a perforated body and a perforated flange engaging one end of the casing, and a nipple engaging the other end of the casing, substantially as specified.

4. In a vent for barrels, a casing $a$, having tubular shank $a'$, combined with a rotatable cock $b$, having shoulder $b^4$, thread $b^3$, and ducts $c$, $c^2$, $c'$, $c^3$, and with a pair of valves $f$, $j$, nut $d$, perforated cap $e$, and nipple $g$, substantially as specified.

Signed by us at New York city, N. Y., this 19th day of July, 1899.

H. FUNK.
K. TSCHIPKE.

Witnesses:
WILLIAM SCHULZ,
FRANK V. BRIESEN.